(12) United States Patent
Kitahara

(10) Patent No.: US 7,760,396 B2
(45) Date of Patent: Jul. 20, 2010

(54) IMAGE FORMING APPARATUS STORING BINARY MONOCHROME IMAGE DATA ON INTERNAL MEMORY AND MULTI-LEVEL IMAGE DATA ON EXTERNAL MEMORY, IMAGE FORMING METHOD, AND COMPUTER PROGRAM PRODUCT

(75) Inventor: Fumihiro Kitahara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 850 days.

(21) Appl. No.: 11/604,827

(22) Filed: Nov. 28, 2006

(65) Prior Publication Data

US 2007/0127068 A1 Jun. 7, 2007

(30) Foreign Application Priority Data

Dec. 6, 2005 (JP) ............................. 2005-352561

(51) Int. Cl.
*G06F 15/00* (2006.01)
(52) U.S. Cl. .................. 358/1.9; 358/524; 358/448; 358/2.1; 358/1.16
(58) Field of Classification Search .................. None
See application file for complete search history.

(56) References Cited

U.S. PATENT DOCUMENTS

| 6,850,653 B2 * | 2/2005 | Abe | 382/312 |
| 2002/0067515 A1 * | 6/2002 | Abe | 358/442 |
| 2004/0239995 A1 * | 12/2004 | Sadowara | 358/2.1 |
| 2004/0246346 A1 * | 12/2004 | Kim et al. | 348/222.1 |
| 2005/0146740 A1 * | 7/2005 | Fukuda | 358/1.14 |
| 2005/0238205 A1 * | 10/2005 | Kimura et al. | 382/112 |
| 2005/0280865 A1 * | 12/2005 | Oteki | 358/2.1 |
| 2006/0132855 A1 * | 6/2006 | Dokuni et al. | 358/448 |

FOREIGN PATENT DOCUMENTS

| JP | 2001-358950 | 12/2001 |
| JP | 2004-104435 | 4/2004 |

\* cited by examiner

*Primary Examiner*—Mark K Zimmerman
*Assistant Examiner*—Javier J Ramos
(74) *Attorney, Agent, or Firm*—Harness, Dickey & Pierce, P.L.C.

(57) ABSTRACT

An image forming apparatus includes an obtaining unit that obtains from outside multilevel image data in color mode for forming a color print, and obtains binary image data in monochrome mode for forming a black-and-white print. The image forming apparatus also includes a volatile memory that stores therein the binary image data.

4 Claims, 6 Drawing Sheets

IMAGE FORMING APPARATUS STORING BINARY MONOCHROME IMAGE DATA ON INTERNAL MEMORY AND MULTI-LEVEL IMAGE DATA ON EXTERNAL MEMORY, IMAGE FORMING METHOD, AND COMPUTER PROGRAM PRODUCT

CROSS-REFERENCE TO RELATED APPLICATIONS

The present document incorporates by reference the entire contents of Japanese priority document, 2005-352561 filed in Japan on Dec. 6, 2005.

BACKGROUND OF THE INVENTION

1. Field of the Invention

The present invention relates to a technology for obtaining image data from outside.

2. Description of the Related Art

In conventional digital equipment, both color and monochrome images are input and output in the same multilevel format. Besides, Japanese Patent Application Laid-Open No. 2001-358950 discloses an image reader that reads and stores color (multilevel) image data together with monochrome (binary) image data even when input image data is specified to be read in color (in a multilevel fashion). Accordingly, it is possible to improve image handling at later stages.

Among low-price color copiers, there is a model with no hard disk drive (HDD) installed therein to reduce the price. In such a model with no HDD, a sort function cannot be used, which results in inconvenience for users.

SUMMARY OF THE INVENTION

It is an object of the present invention to at least partially solve the problems in the conventional technology.

According to an aspect of the present invention, an image forming apparatus includes an obtaining unit that is configured to obtain multilevel image data when in color mode, and obtain binary image data when in monochrome mode, and a volatile memory that stores therein the binary image data.

According to another aspect of the present invention, an image forming method includes obtaining multilevel image data when in color mode, obtaining binary image data when in monochrome mode, and storing the binary image data in a volatile memory.

According to still another aspect of the present invention, a computer program product comprising a computer usable medium having computer readable program codes embodied in the medium that, when executed, causes a computer to implement the above method.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained below with reference to the accompanying drawings.

Figure 1:
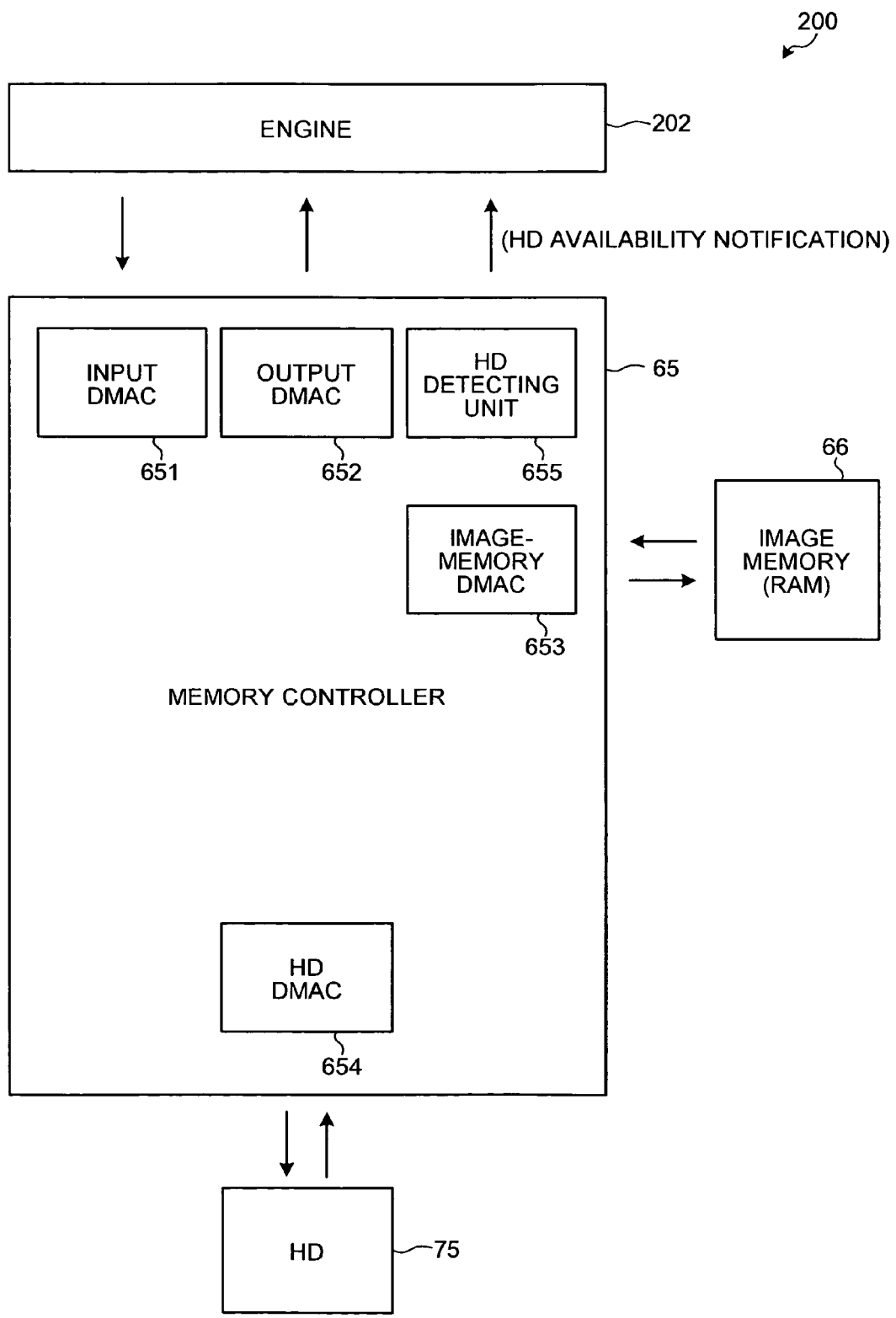
FIG. 1 is a block diagram of an image forming apparatus according to an embodiment of the present invention.

FIG. 1 is a block diagram of an image forming apparatus 200 according to an embodiment of the present invention. The image forming apparatus 200 includes an engine 202, a memory controller 65, and an image memory 66. The memory controller 65 includes an input direct memory access controller (DMAC) 651 that transfers data from the engine 202, an output DMAC 652 that transfers data to the engine 202, an image-memory DMAC 653 that performs data transfer with the image memory 66, a hard disk (HD) DMAC 654 that performs data transfer with an HD 75, and an HD detecting unit 655 that notifies whether the HD 75 is connected to the memory controller 65. The image memory 66 is capable of temporary storage and is, specifically, a volatile memory (random-access memory (RAM)).

In color mode for forming a color print, the memory controller 65 obtains multilevel image data from the engine 202 through the input DMAC 651. In monochrome mode for forming a black-and-white print, the memory controller 65 obtains binary image data.

In the case of binary image data without sorting, a normal operation is performed. That is, an image is formed according to the obtained binary data. When sort is selected, the image data is stored in the image memory 66. In the case of multilevel image data (color image data), sorting is not performed because it requires a large amount of memory capacity.

When the HD 75 is connected to the memory controller 65, the HD detecting unit 655 detects this, and then notifies the engine 202 that the HD 75 has been mounted. When the HD 75 is mounted, a large amount of image data can be stored in the HD 75. Therefore, when the HD is mounted, the engine 202 transfers multilevel image data to the memory controller 65 even in monochrome mode. Then, the multilevel image-data is stored in the HD 75. With this, image quality can be improved.

Figure 2:
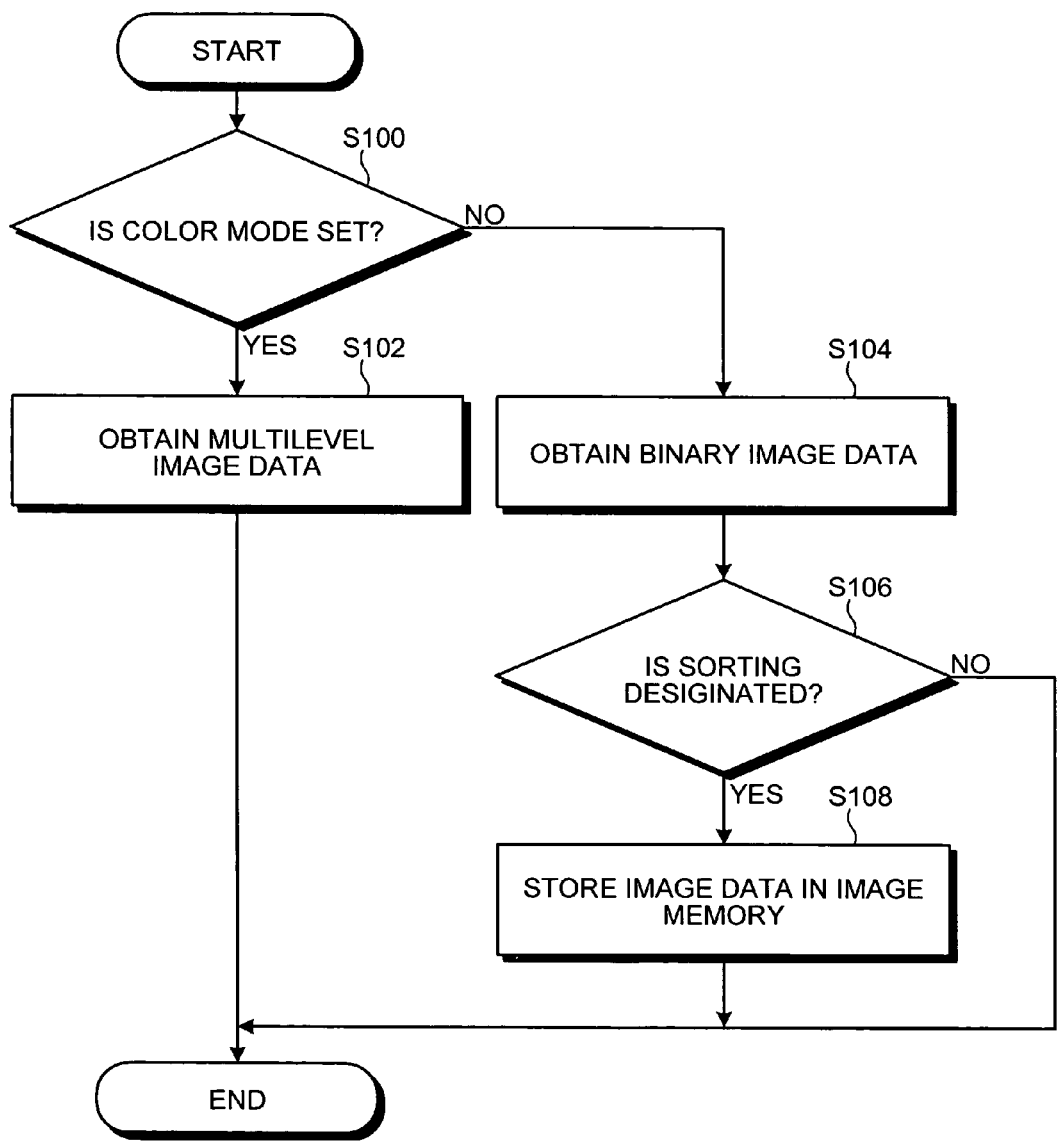
FIG. 2 is a flowchart of the operation of the image forming apparatus 200 to obtain image data.

FIG. 2 is a flowchart of the operation of the image forming apparatus 200 to obtain image data. The image forming apparatus 200, in color mode (Yes at step S100), obtains multilevel image data (step S102). Then, an image is formed through normal operation. On the other hand, in monochrome mode (No at step S100), the image forming apparatus 200 obtains binary image data (step S104).

When sort is selected (Yes at step S106), image data is stored in the image memory 66 (step S108), and sorted. On the other hand, when no sort is selected (No at step S106), an image is formed through normal operation. Then, the process is completed.

When the HD 75 is mounted, multilevel image data is obtained even in monochrome mode. The obtained multilevel image data is stored in the HD 75. With this, even if a failure such as a jam occurs, for example, the image data stored in the HD 75 can be used for performing an image forming process.

Figure 3:
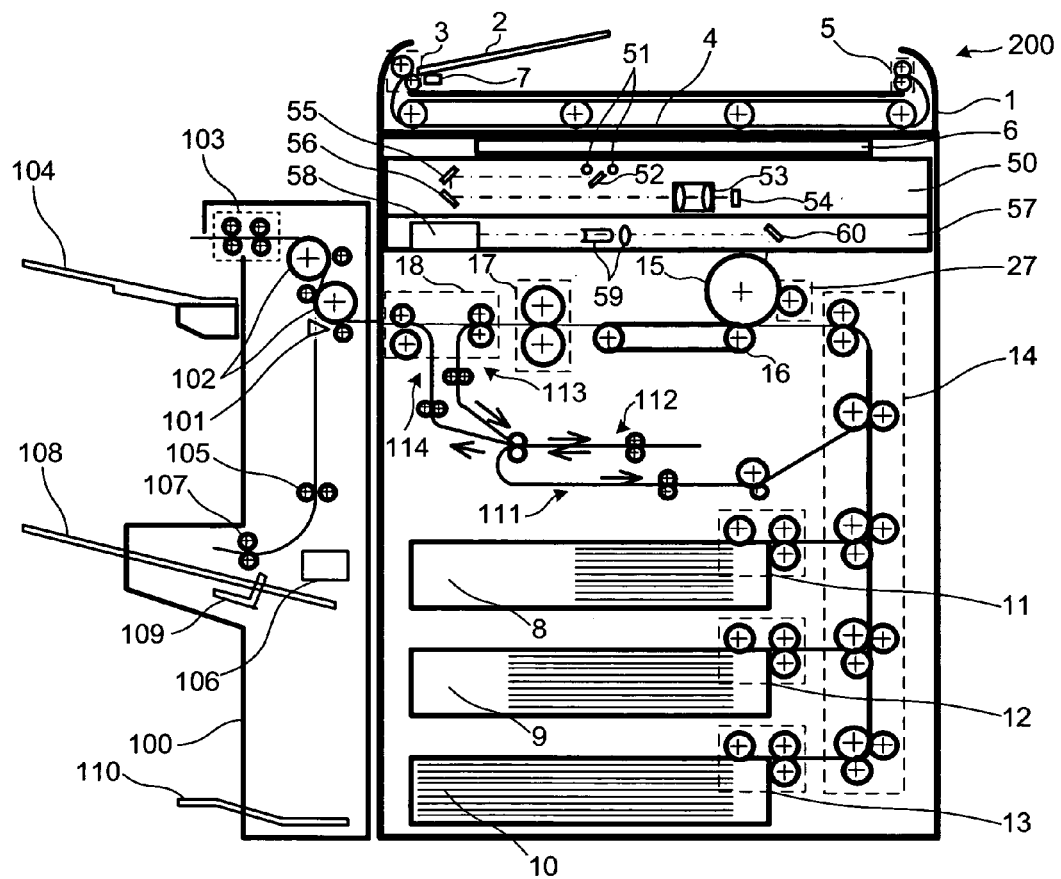
FIG. 3 is a detailed diagram of the image forming apparatus.

FIG. 3 depicts a detailed configuration of the image forming apparatus 200. A stack of originals or document sheets is placed on a document tray 2 of an automatic document feeder (hereinafter, "ADF") 1 with their surfaces facing up. When a print key 34 on an operating unit 30 is pressed, the sheets are fed, from the bottom one, to a predetermined position on a contact glass 6 by feed rollers 3 and a feed belt 4. The image forming apparatus 200 counts up the number of sheets upon completion of feeding one sheet.

Image data is read by a reading unit 50 from the original on the contact glass 6. The original read by the reading unit 50 is discharged by the feed belt 4 and delivery rollers 5. When a detector 7 detects that the next document sheet is present on the document tray 2, the document sheet is fed onto the contact glass 6 as with the previous document sheet. The feed rollers 3, the feed belt 4, and the delivery rollers 5 are driven by a conveyor motor 26.

The transfer sheets stacked on a first paper tray 8, a second paper tray 9, and a third paper tray 10 are fed by a first paper-feeding device 11, a second paper-feeding device 12, and a third paper-feeding device 13, respectively, and are conveyed to a position where the fed. sheet contacts a photosensitive member 15 by a vertical conveying unit 14.

The image data read by the reading unit 50 is written to the photosensitive member 15 by a laser beam from a writing unit 57, and then passes through a developing unit 27, thereby forming a toner image. Then, the toner image on the photosensitive member 15 is transferred onto a transfer sheet while the transfer sheet is being conveyed by a conveyor belt 16 at a speed equal to that of the rotation of the photosensitive member 15.

The image is then fixed by a fixing unit 17, and is delivered by a discharging unit 18 to a finisher 100 of a post-processing device. The finisher 100 can guide the transfer sheet conveyed by the discharging unit 18 in a direction of normal delivery rollers 102 and in a direction of a stapling process unit. By switching a switching plate 101 up, the transfer sheet can be delivered via conveyor rollers 103 to a normal discharge tray 104 side. By switching the switching plate 101 down, the transfer sheet can be conveyed via conveyor rollers 105 and 107 to a stapling tray 108.

A paper jogger aligns the edges of a stack of transfer sheets on the stapling tray 108 every time a transfer sheet is delivered thereon. Upon completion of copying for one set, the transfer sheets are stapled by a stapler 106. The transfer sheet stack stapled by the stapler 106 rests on a staple-completed discharge tray 110 under its own weight.

On the other hand, the normal discharge tray 104 is movable forward and backward. The discharge tray 104 sorts the copy sheets delivered in a simplified manner while moving alternately forward and backward for each sheet or each copy set sorted by the image memory.

When an image is formed on both sides of the transfer sheet, the transfer sheet fed from any one of paper trays 8 to 10 and then formed with an image is not directed to the discharge tray 104 side, but once stocked in a double-side paper-feeding unit 111 by setting a branch nail 112 for route switching upward.

Then, to transfer a toner image on the photosensitive member 15 onto the transfer sheets, the transfer sheets stocked in the double-side paper-feeding unit 111 is again fed therefrom and guided to the discharge tray 104 by setting the branch nail 112 downward. In such a manner, the double-side paper-feeding unit 111 is used when an image is formed on both sides of a transfer sheet.

The photosensitive member 15, the conveyor belt 16, the fixing unit 17, the discharging unit 18, and the developing unit 27 are driven by a main motor 25. The paper-feeding devices 11 to 13 are driven by paper-feed clutches 22 to 24, respectively, through transmission of a driving force of the main motor 25. The vertical conveying unit 14 is driven by an intermediate clutch 21 through transmission of a driving force of the main motor 25.

Figure 4:
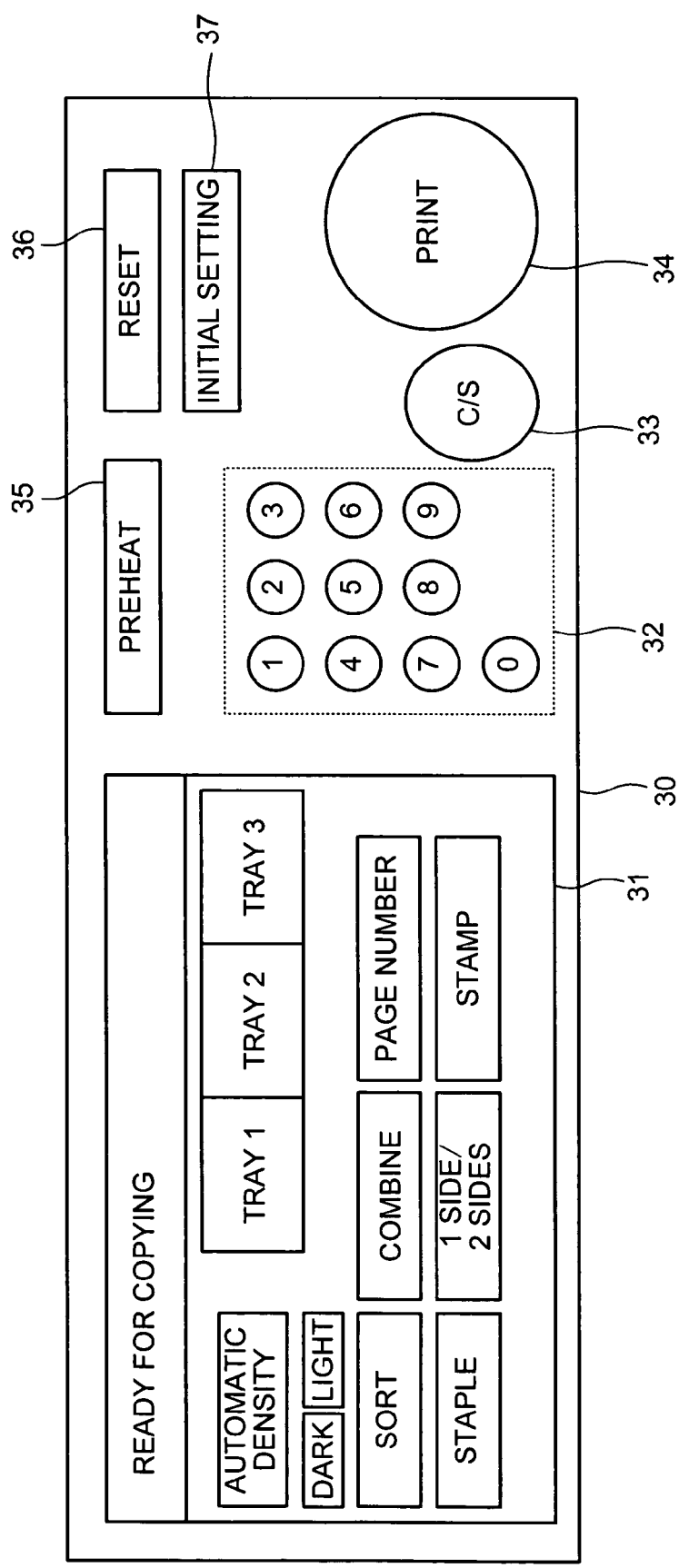
FIG. 4 is a schematic of an operating unit of the image forming apparatus.

FIG. 4 is a schematic of the operating unit 30. The operating unit 30 includes a liquid crystal display (LCD) panel 31, a ten key 32, a clear/stop key 33, the print key 34, a preheat key 35, a reset key 36, and an initial setting key 37. On the LCD panel 31, for example, various function keys and a message indicating the state of the image forming apparatus 200 are displayed.

With an operator touching a key displayed on the LCD panel 31, a key indicating a selected function is highlighted. When function parameters (for example, the type of printing) have to be specified, a screen for setting function parameters is displayed by touching a corresponding key. The LCD panel uses a dot displayer, and therefore, an optimum display at that time can be graphically performed.

By pressing the initial setting key 37, the initial states of the machine can be arbitrarily customized. For example, the paper size accommodated in the machine can be set, or the state to be set when pressing a reset key for a copying function can be arbitrary set. In addition, an application to be selected with priority when no operation is performed for a predetermined period can be selected. Further, it is possible to set a time to shift to low power mode according to the international energy star plan, and a time to shift to auto-off/sleep mode.

When a preheat key 35 is pressed, the machine is changed from a waiting state to a lower-power state, in which a fixing temperature is decreased and a light of a display on the operating unit is turned out. The preheat state means a low-power state in the international energy star plan. Also, to cancel the preheat state and an OFF state/sleep state to change the state to a waiting state, this preheat key is again pressed.

Figure 5:
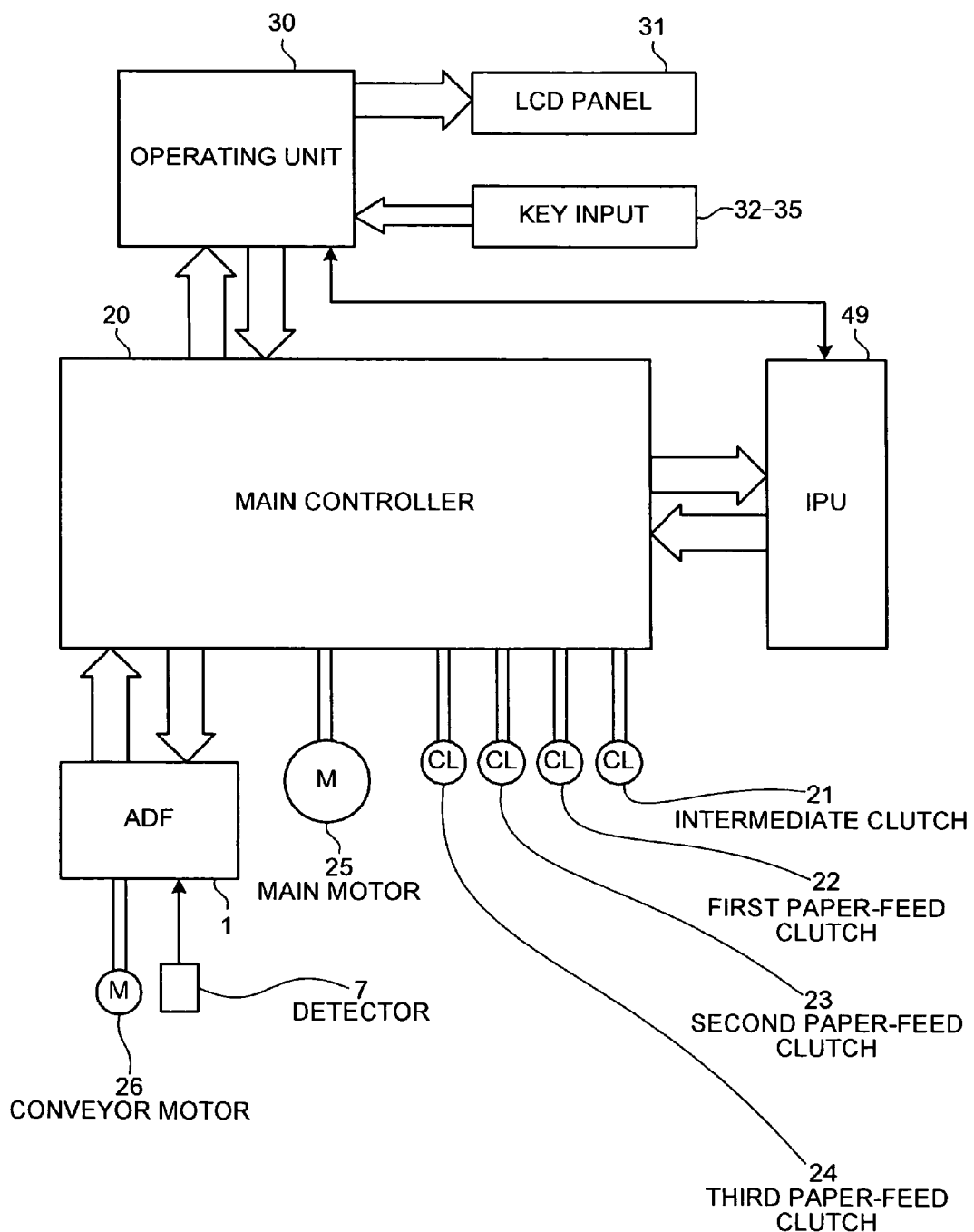
FIG. 5 is a block diagram of a controlling device of the image forming apparatus.

FIG. 5 depicts a controlling device of the image forming apparatus 200, mainly a main controller 20. The main controller 20 controls the entire image forming apparatus 200. To the main controller 20, distributed control devices are connected, such as the operating unit 30 for displaying information to the operator and controlling a function setting input from the operator, an image processing unit (IPU) 49 for controlling a scanner, writing original data to the image memory, and forming an image based on the data in the image memory, and the ADF 1. Each distributed control device and the main controller 20 exchange, as required, the state of the machine and operation instructions therebetween. The main motor 25 and various clutches 21 to 24 required for conveying paper sheets are also connected.

Returning to FIG. 3, the process from document reading to image writing in the image forming apparatus 200 is explained. The reading unit 50 includes the contact glass 6 on which a document sheet is placed, and an optical scanning system. The optical scanning system includes, for example, an exposure lamp 51, a first mirror 52, a lens 53, and a charge-coupled device (CCD) image sensor 54. The exposure lamp 51 and the first mirror 52 are fixed onto a first carriage (not shown), whilst a second mirror 55 and a third mirror 56 are fixed onto a second carriage (not shown).

When an image on a document sheet is read, the first carriage and the second carriage are mechanically operated at a relative speed of 2:1 so that an optical-path length is not changed. This optical scanning system is driven by a scanner driving motor (not shown). The image on the document is read by the CCD image sensor 54, and then converted to an electrical signal for processing.

The writing unit 57 includes a laser output unit 58, an image forming lens 59, and a mirror 60. The laser output unit 58 has provided therein a polygon mirror rotating at a constant high speed by a laser diode, which is a laser light source, and a motor. Laser light output from the writing unit 57 is applied onto the photosensitive member 15 of an image forming system. A beam sensor that generates a main-scanning synchronizing signal is placed at a position (not shown) which is near one end of the photosensitive member 15 and to which a laser beam is focused.

Figure 6:
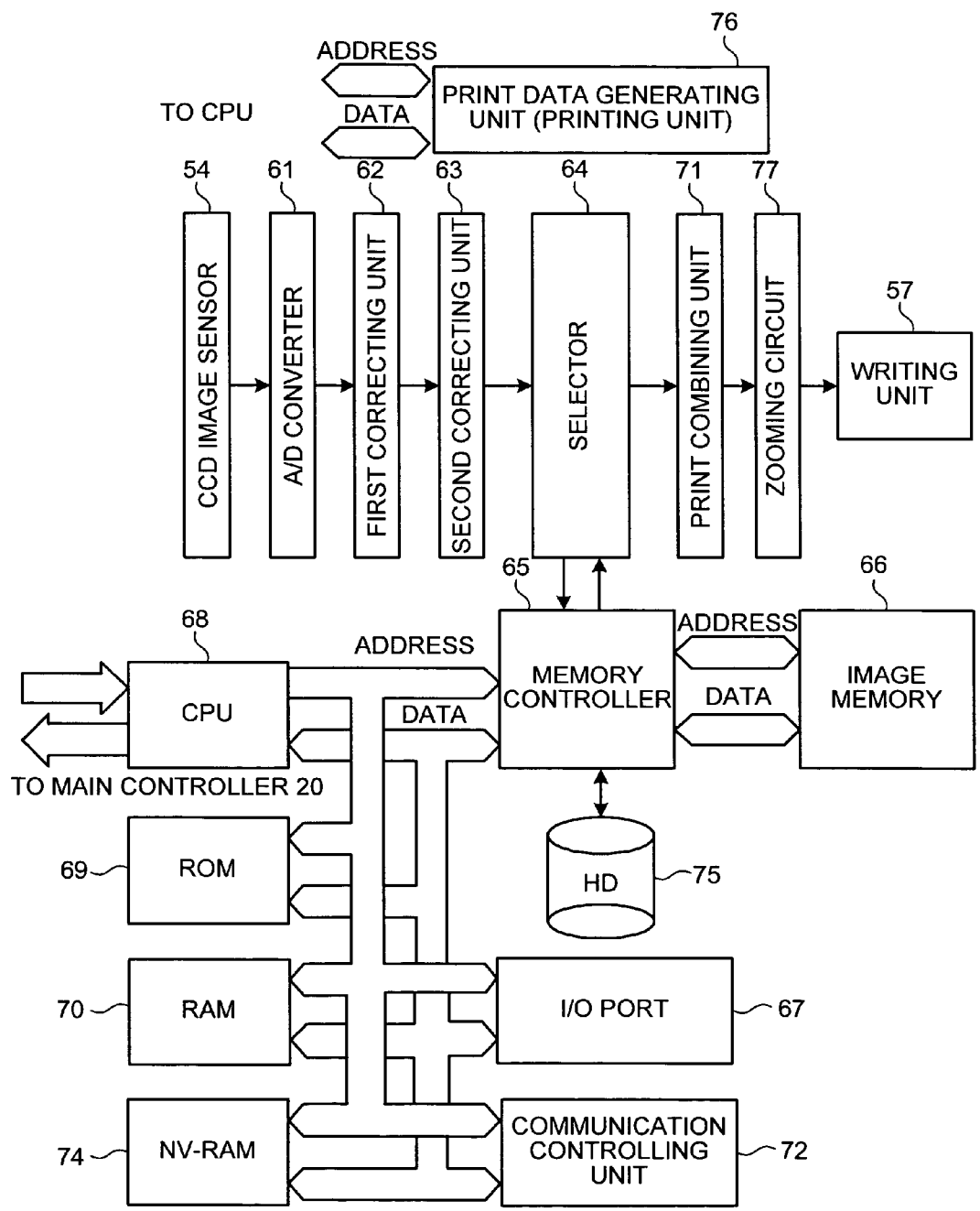
FIG. 6 is a block diagram of an image processing unit (IPU) shown in FIG. 5.

FIG. 6 is a block diagram of an internal configuration of the IPU 49. Reflected light of the light emitted from the exposure lamp 51 is subjected to photoelectric conversion at the CCD image sensor 54, and is the converted by an analog-to-digital (A/D) converter 61 to a digital signal. An image signal converted to a digital signal is subjected to shading correction by a first correcting unit 62, and is then subjected to Modulation Transfer Function (MTF) correction, y correction, etc. by a second correcting unit 63. Then, a selector 64 sends the image data input via a print combining unit 71 to a zooming circuit 77 or the memory controller 65 while switching between them. The image data is enlarged or reduced by the zooming circuit 77 at a desired magnification, and is then sent via a print data generating unit 76 to the writing unit 57.

On the other hand, between the memory controller 65 and the selector 64, an image signal can be input or output bi-directionally. Although not particularly depicted in FIG. 6, it is assumed that, to be able to process, in addition to image data input from the reading unit 50, image data externally supplied via an input/output (I/O) port 67 or a communication controlling unit 72, such as process data input from a data processing device such as a personal computer, the IPU 49 has a function of selecting inputs and outputs of a plurality of pieces of data.

Via the I/O port 67, a network connection of the image forming apparatus 200 is achieved. An example of a communication scheme can be a Transmission Control Protocol/Internet Protocol (TCP/IP) communication protocol, which is widely available as a standard protocol for the Internet. With this, transmission and reception of machine configuration information and operating states of network-connected image forming apparatuses, or a control command, such as a remote output command, and a setting command are performed.

The communication controlling unit 72 has a function of digitizing analog information obtained from a wireless communication network via an attached antenna (not shown), or converting data stored in the image memory 66, the HD 75, a read-only memory (ROM) 69, a random access memory (RAM) 70, and a non-volatile random access memory (NV-RAM) 74 to analog information, for transmission via a wireless communication network to a predetermined portable terminal. With this, data transmission and reception between general telephones and an image forming apparatus is possible.

The IPU 49 also includes a CPU 68 that sets the memory controller 65 and others and controls the reading unit 50 and the writing unit 57, and the ROM 69, the RAM 70, and the NV-RAM 74 that store programs and data for the CPU 68. Furthermore, the CPU 68 can write and read data in and from the image memory 66 via the memory controller 65.

Image data of an original sent to the memory controller 65 is compressed by an image compressing device provided in the memory controller, and is then sent to the image memory 66. Although it is possible to write data with 256 level gray scale corresponding to a maximum image size in the image memory 66 as it is, a large amount of memory capacity is required for a set of image data. With the image being compressed, limited memory capacity can be effectively used.

Additionally, a large amount of image data can be stored at one time, and the stored image data can be output in the order of pages. In this case, at the time of outputting an image, the data in the image memory 66 is output while being expanded by an expanding device in the memory controller 65. Such a function is generally called electronic sorting.

With a function of the image memory, image data can be sequentially read from a plurality of originals into areas obtained by dividing an area in the image memory for one transfer sheet. For example, image data of four sheets are sequentially written to areas obtained by dividing an area in the image memory for one transfer sheet, thereby making it possible to obtain a copy output with four document sheets being combined into one sheet. Such a function is generally called combination copying.

The image data in the image memory 66 is accessible from the CPU 68. Therefore, the contents of the image memory can be processed. For example, an image decimating process and an image cutting-out process can be performed. For image memory processing, data is written to a register of the memory controller 65. The processed image is again retained in the image memory.

The image memory 66 is divided into a plurality of areas according to the size of image data to be handled, thereby allowing input and output of image data to be simultaneously performed. To allow input and output of image data to be performed in parallel to and from each divided area, the image memory is connected to an interface with the memory controller via two sets of address data lines for read and write. With this, such an operation can be possible in which while an image is input (written) in an area 1, an image is output (read) from an area 2.

In the image memory 66, a hard disk can be additionally provided to store more image data. By using a hard disk, there is also a feature in which an external power supply is not required and images can be permanently retained. To read a plurality of standard-sized sheets (format originals) by a scanner for retention, it is often the case that a hard disk is used.

For writing and reading, to absorb a difference in processing speed for image formation and image writing from the scanner, data is once stored in the image memory for processing. To send data from the image storage device to the writing unit 57, the data is once stored in the image memory 66, and is then sent to the writing unit 57. As such, for input and output of an image with respect to the image memory 66 and the HD 75, which are image storage devices, the scanner, and the writing unit, all image paths are determined by the memory controller 65.

An image forming program executed to perform the process of obtaining image data, explained with reference to FIG. 2, is stored in the ROM 69. The CPU 68 operates according to programs in the ROM 69 to control each component of the memory controller 65.

The image forming program can be provided by being stored in a computer-readable recording medium, such as a compact disc read-only memory (CD-ROM), a floppy (registered trademark) disc (FD), or a DVD (digital versatile disc), in an installable format or an executable format.

In this case, the image forming program is loaded onto a main storage device by being read and executed from the recording medium in the image forming apparatus 200, and each component explained in the software configuration is generated on the main storage device.

Besides, the image forming program can be stored in a computer connected to a network, such as the Internet, and then downloaded via the network.

As set forth hereinabove, according to an embodiment of the present invention, in color mode for forming a color print, image data is received in multilevel format. On the other hand, in monochrome mode for forming a black-and-white print, image data is received in binary format. A volatile memory is used to store the binary image data when the image data is to be sorted. Therefore, less memory capacity is required.

Moreover, when an external storage device is connected to the image forming apparatus, image data is received in multilevel format even in monochrome mode. The multilevel image data is stored in the external storage device. Thus, image quality can be improved.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
    an obtaining unit that is configured to obtain multilevel image data when in color mode, and obtain binary image data when in monochrome mode;
    a volatile memory that stores therein the binary image data;
    an external-storage control unit that stores image data obtained by the obtaining unit in an external storage device connected to the image forming apparatus;
    a detecting unit that detects that the external storage device is connected to the image forming apparatus; and
    a control unit that instructs, when the external storage device is connected to the image forming apparatus, the obtaining unit to obtain multilevel image data even in monochrome mode, wherein
        the external-storage control unit stores the multilevel image data in the external storage device.

2. The image forming apparatus according to claim 1, wherein the volatile memory stores the binary image data when the binary image data is to be sorted during printing.

3. An image forming method using an image forming apparatus, the image forming method comprising:
    obtaining multilevel image data when in color mode;
    obtaining binary image data when in monochrome mode;
    storing the binary image data in a volatile memory;
    storing obtained image data in an external storage device connected to the image forming apparatus;
    detecting a connection of the external storage device to the image forming apparatus;
    obtaining multilevel image data in monochrome mode based on an instruction received from a control unit when the external storage device is connected to the image forming apparatus; and
    storing the multilevel image data in the external storage device.

4. A computer program product comprising a computer usable non-transitory medium having computer readable program codes embodied in the medium that, when executed, cause a computer to:
    obtain multilevel image data when in color mode;
    obtain binary image data when in monochrome mode;
    store the binary image data in a volatile memory;
    store obtained image data in an external storage device connected to the image forming apparatus;
    detect a connection of the external storage device to the image forming apparatus;
    obtain multilevel image data in monochrome mode based on an instruction received from a control unit when the external storage device is connected to the image forming apparatus; and
    store the multilevel image data in the external storage device.

* * * * *